(12) United States Patent
Horiuchi et al.

(10) Patent No.: US 7,659,021 B2
(45) Date of Patent: Feb. 9, 2010

(54) POWER GENERATING APPARATUS USING SOLID OXIDE FUEL CELL

(75) Inventors: Michio Horiuchi, Nagano (JP); Shigeaki Suganuma, Nagano (JP); Misa Watanabe, Chandler, AZ (US); Yasue Tokutake, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 670 days.

(21) Appl. No.: 11/372,832

(22) Filed: Mar. 10, 2006

(65) Prior Publication Data

US 2006/0204809 A1   Sep. 14, 2006

(30) Foreign Application Priority Data

Mar. 14, 2005   (JP) .............................. 2005-071645

(51) Int. Cl.
*H01M 8/04* (2006.01)
*H01M 8/12* (2006.01)

(52) U.S. Cl. ............................. 429/26; 429/30; 429/32; 429/38

(58) Field of Classification Search .................. 429/26, 429/30, 32, 34, 38
See application file for complete search history.

(56) References Cited

U.S. PATENT DOCUMENTS

| 4,640,875 A | * | 2/1987 | Makiel ...................... 429/26 X |
| 5,273,837 A | | 12/1993 | Aitken et al. ................... 429/30 |
| 2003/0054222 A1 | | 3/2003 | Horiuchi et al. |
| 2003/0186104 A1 | | 10/2003 | Horiuchi et al. |

FOREIGN PATENT DOCUMENTS

| DE | 10059892 | 6/2002 |
| EP | 1394885 | 3/2004 |
| JP | 2002280053 | 9/2002 |
| JP | 2003-92124 | 3/2003 |
| JP | 2003-297397 | 10/2003 |
| WO | WO0173881 | 10/2001 |

\* cited by examiner

*Primary Examiner*—Stephen J. Kalafut
(74) *Attorney, Agent, or Firm*—Walter G. Hanchuk; Chadbourne & Parke LLP

(57) ABSTRACT

The present invention relates to a power generating apparatus using a solid oxide fuel cell. A plurality of solid oxide fuel cells, each comprising a solid oxide substrate, a porous cathode electrode layer, and a porous anode electrode layer, are stacked vertically and housed inside a walled structure. A mixture gas is supplied to each solid oxide fuel cell from above. An exhaust gas discharged from each fuel cell is burned in a space below each fuel cell, producing a flame. Each fuel cell is heated by this flame.

18 Claims, 9 Drawing Sheets

NON-PRIOR ART

Fig. 9

PRIOR ART

Fig.10

POWER GENERATING APPARATUS USING SOLID OXIDE FUEL CELL

CROSS-REFERENCE TO RELATED APPLICATION

This application claims the priority of Japanese Patent Application Number 2005-71645, filed on Mar. 14, 2005.

BACKGROUND OF THE INVENTION

1. Field of the Invention

The present invention relates to a power generating apparatus using a solid oxide fuel cell and, more particularly, to a power generating apparatus using a solid oxide fuel cell that comprises a cathode layer and an anode layer formed on a solid oxide substrate, and that can provide increased power generation efficiency and can easy utilization of heat, while also providing a compact construction, by employing a simple structure that does not require hermetic sealing.

2. Description of the Related Art

Heretofore, fuel cells have been developed and commercially implemented as a low-pollution power generating means to replace traditional power generation systems such as thermal power generation systems, or as electric energy sources for electric vehicles that replace internal combustion engines which use gasoline or the like as the fuel. Fuel cells are also attracting attention as power supply sources for personal computers, etc. For such fuel cells, much research work has been done to develop higher-efficiency and low-cost fuel cells.

There are various types of fuel cells classified according to how they generate power, one type being a fuel cell that uses a solid electrolyte. To give an example of such a solid oxide fuel cell using a solid electrolyte, there is a fuel cell that uses, as a solid oxide substrate, an oxygen ion conducting solid electrolyte formed from a calcined structure of yttria($Y_2O_3$)-doped stabilized zirconia.

The fuel cell that uses such a solid oxide substrate comprises a cathode electrode layer formed on one surface of a flat plate solid oxide substrate and an anode electrode layer formed on the opposite surface thereof, and the solid oxide substrate, the cathode electrode layer, and the anode electrode layer together form one solid oxide fuel cell unit.

Oxygen or an oxygen-containing gas is supplied to the cathode electrode layer, while a fuel gas such as methane is supplied to the anode electrode layer. A potential difference occurs between the cathode electrode layer and the anode electrode layer and, when lead wires are connected to the cathode electrode layer and the anode electrode layer, the fuel cell can generate electric power.

However, in the case of a power generating apparatus using this type of fuel cell, separate chambers must be provided, one being an oxygen or an oxygen-containing gas supply chamber on the cathode layer side and the other a fuel gas supply chamber on the anode layer side.

On the other hand, in another type of fuel cell power generating apparatus, the fuel cell unit is constructed by forming a cathode electrode layer and an anode electrode layer on opposite surfaces of a solid oxide substrate, and an electromotive force is generated between the cathode electrode layer and the anode electrode layer by placing the fuel cell unit in a mixture gas atmosphere containing a fuel gas, for example, methane gas, and oxygen gas.

The principle of generating an electromotive force between the cathode electrode layer and the anode electrode layer in this type of fuel cell power generating apparatus is the same as that for the above-described separate-chamber type fuel cell power generating apparatus but, as the whole fuel cell unit can be placed in substantially the same atmosphere, the fuel cell unit can be constructed as a single-chamber type unit to which the mixture gas is supplied, and this serves to increase the durability of the fuel cell unit.

However, in this single-chamber fuel cell power generating apparatus, as the fuel cell has to be operated at a high temperature of about 1000° C., there is the danger that the mixture gas may explode. Here, if the oxygen concentration is reduced to a level lower than the ignitability limit to avoid such danger, there occurs the problem that carbonization of the fuel, such as methane, progresses and the fuel cell performance degrades. In view of this, there is proposed, for example, in Japanese Unexamined Patent Publication No. 2003-92124, a single-chamber fuel cell power generating apparatus that can use a mixture gas whose oxygen concentration is controlled so as to be able to prevent the progress of carbonization of the fuel, while at the same time, preventing an explosion of the mixture gas.

Another power generating apparatus that uses a solid oxide fuel cell is proposed in Japanese Unexamined Patent Publication No. 2003-297397. In this fuel cell power generating apparatus, the space inside the container, except the space occupied by the fuel cell unit, is provided with explosion preventing means, and further, the exhaust gas discharged from the fuel cell unit is burned by a combustion device to ensure safe treatment of the exhaust gas.

The above-cited Japanese Unexamined Patent Publication No. 2003-297397 further discloses a fuel cell power generating apparatus in which the solid oxide fuel cell unit is mounted in a vertical position within the container, and the container is changed from a hermetically sealed type to an open type.

In the fuel cell power generating apparatus changed to the open type, the exhaust gas discharged from the fuel cell unit is burned in the space created in the upper part of the container, thereby ensuring safe treatment of the fuel cell exhaust gas while prevention an explosion of the exhaust gas.

In this fuel cell power generating apparatus, it is possible to enhance the energy utilization efficiency by recovering part of the heat generated by the combustion of the exhaust gas by using a heat recovering means such as a heating coil provided in the combustion device. However, a heater is mounted around the outer circumference of the container to heat the solid oxide fuel cell unit. In view of this, the above-cited Japanese Unexamined Patent Publication No. 2003-297397 proposes that, in the fuel cell power generating apparatus, the solid oxide fuel cell unit be heated by the combustion device using the exhaust gas, thereby eliminating the need for the heater.

In this fuel cell power generating apparatus, the end of the exhaust pipe is pointed toward the sidewall of the container where the combustion device is mounted. The heat produced by burning the exhaust gas introduced to the end of the exhaust pipe is used for heating the fuel cell housing section of the container. The solid oxide fuel cell can thus be readily heated to its operating temperature.

However, in the fuel cell power generating apparatus disclosed in the above-cited Japanese Unexamined Patent Publication No. 2003-297397, the exhaust gas discharged from the solid oxide fuel cell unit is introduced to the outer circumference of the cylindrical container for combustion; the fuel cell unit itself can be heated by the combustion heat but, because the combustion of the exhaust gas occurs outside the container, a special exhaust pipe and a special combustion device must be provided and, in addition to that, the cylindrical container must be hermetically sealed, which makes it indispensable to provide filler layers. As a result, the fuel cell power generating apparatus not only becomes complex in construction but its volume also increases.

Accordingly, it is an object of the present invention to provide a solid oxide fuel cell that ensures safe exhaust gas treatment while preventing an explosion of the exhaust gas within the fuel cell, that allows the fuel cell unit to be readily heated to its operating temperature by the combustion of the exhaust gas, that provides a simple construction, and that has an increased the power generation density per unit volume.

SUMMARY OF THE INVENTION

To solve the above problems, a power generating apparatus using a solid oxide fuel cell according to the present invention comprises: a solid oxide fuel cell unit having a solid oxide substrate, a porous cathode electrode layer formed on one surface of the substrate, and a porous anode electrode layer formed on the other surface of the substrate opposite from the one surface; a wall structure having a housing section which encircles and houses therein the solid oxide fuel cell unit with the surfaces thereof held in a vertical position; a supply device for supplying air and fuel to the solid oxide fuel cell unit from above the housing section; and a combustion device for heating the solid oxide fuel cell unit by combusting an exhaust gas exiting from a lower end of the solid oxide fuel cell unit in a space below the housing section.

A plurality of such solid oxide fuel cell units, each formed in the shape of a flat plate, are stacked and housed in the housing section in such a manner that the cathode electrode layer or the anode electrode layer of each of the solid oxide fuel cell units is in direct contact with the anode electrode layer or the cathode electrode layer of an adjacent one of the solid oxide fuel cell units.

The solid oxide fuel cell units are stacked by interposing a separator layer between each of the solid oxide fuel cell units and an adjacent one of the solid oxide fuel cell units, and the supply device supplies air to each of the cathode electrode layers from an upper end thereof, and supplies fuel to each of the anode layers from an upper end thereof, wherein the separator layer is formed from an electrically conductive or electrically insulating plate.

Alternatively, the supply device supplies a mixed gas containing air and fuel to each of the solid oxide fuel cell units from an upper end thereof.

The solid oxide fuel cell units are stacked by interposing a gas-permeable electrically conductive layer between each of the solid oxide fuel cell units and an adjacent one of the solid oxide fuel cell units, wherein the electrically conductive layer is formed from a metal or electrically conductive ceramic porous structure, or the electrically conductive layer has a groove formed along a vertical direction. Alternatively, the electrically conductive layer is formed from a plate corrugated at right angles to a vertical direction or from a metal or carbon woven fabric.

The plurality of solid oxide fuel cell units are divided into unit arrays, and the unit arrays are stacked inside the wall structure, wherein an electrically insulating intervening layer is inserted between the stacked unit arrays, and outputs of the unit arrays are connected in parallel.

The plurality of solid oxide fuel cell units are vertically divided into unit arrays by interposing an electrically insulating porous layer therebetween, and the unit arrays are stacked inside the wall structure, wherein the outputs of the unit arrays are connected in parallel.

The solid oxide fuel cell unit is formed as a wound structure spirally wound around a vertical axis. The wound structure is formed from a plurality of solid oxide fuel cell units stacked one on top of another, and a plurality of such wound structures are arranged in parallel to each other within the housing section, wherein the supply device supplies a mixture gas containing the air and the fuel to the solid oxide fuel cell unit from an upper end thereof.

An electrically insulating porous layer is formed on a lower surface of the housing section, and the exhaust gas is supplied to the combustion device via the electrically insulating layer.

In the power generating apparatus using the solid oxide fuel cell according to the present invention, a heat insulator layer is provided on the outside of the wall structure, and further, a cooler or a heat exchanger is provided on the outside of the heat insulator layer.

As described above, the power generating apparatus using the solid oxide fuel cell according to the present invention comprises the wall structure having a housing section which encircles and houses therein the solid oxide fuel cell unit with the surfaces thereof held in a vertical position, the supply device for supplying air and fuel to the solid oxide fuel cell unit from above the housing section, and the combustion device for heating the solid oxide fuel cell unit by combusting an exhaust gas exiting from the lower end of the solid oxide fuel cell unit in the space below the housing section; accordingly, the exhaust gas can be treated safely while preventing the explosion of the exhaust gas within the fuel cell, and further, the area near the fuel cell unit can be readily heated to the fuel cell operating temperature by utilizing the combustion of the exhaust gas.

It therefore becomes possible to start the power generating operation of the solid oxide fuel cell by using a simple structure for heating the solid oxide fuel cell unit. Furthermore, the construction of the power generating apparatus using the solid oxide fuel cell can be simplified, and the power generation density per unit volume can also be increased.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DESCRIPTION OF THE PREFERRED EMBODIMENTS

Embodiments of the power generating apparatus using a solid oxide fuel cell according to the present invention will be described below with reference to the drawings. However, before proceeding to the description of the power generating apparatus using a solid oxide fuel cell according to the present invention, a power generating apparatus using a solid oxide fuel cell proposed in the prior art will be described in order to clarify the features and advantages of the present invention.

Figure 8:
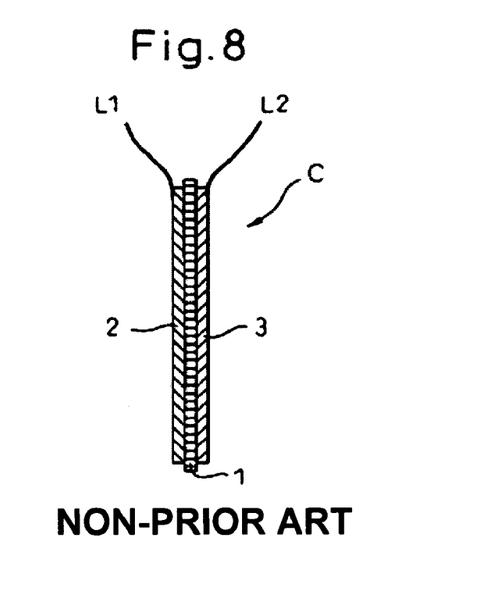
FIG. 8 is a diagram for explaining the structure of a solid oxide fuel cell unit.

FIG. 8 shows the structure of the solid oxide fuel cell used in the power generating apparatus. The solid oxide fuel cell comprises a cathode electrode layer 2 formed on one surface of a flat plate solid oxide substrate 1 and an anode electrode layer 3 formed on the opposite surface thereof, and the solid oxide substrate, the cathode electrode layer, and the anode electrode layer together form one solid oxide fuel cell unit C. Here, oxygen or an oxygen-containing gas is supplied to the cathode electrode layer 2, while a fuel gas such as methane is supplied to the anode electrode layer 3.

In this solid oxide fuel cell unit C, the oxygen ($O_2$) supplied to the cathode electrode layer 2 is converted into oxygen ions ($O^{2-}$) at the boundary between the cathode electrode layer 2 and the solid oxide substrate 1, and the oxygen ions are conducted through the solid oxide substrate 1 into the anode electrode layer 3 where the ions react with the fuel gas, for example, a methane gas ($CH_4$), supplied to the anode electrode layer 3, producing water ($H_2O$), carbon dioxide ($CO_2$), hydrogen ($H_2$), and carbon monoxide (CO). In this reaction process, the oxygen ions release electrons, and a potential difference therefore occurs between the cathode electrode layer 2 and the anode electrode layer 3. Here, when lead wires L1 and L2 are attached to the cathode electrode layer and the anode electrode layer, the electrons in the anode electrode layer 3 flow into the cathode layer 2 via the lead wires, and the fuel cell can thus generate electric power. The operating temperature of this fuel cell is about 1000° C.

However, the power generating apparatus using this type of solid oxide fuel cell requires the provision of separate chambers, one being an oxygen or oxygen-containing gas supply chamber on the cathode layer side and the other a fuel gas supply chamber on the anode layer side; furthermore, since the fuel cell is exposed to oxidizing and reducing atmospheres at high temperatures, it has been difficult to increase the durability of the fuel cell unit.

On the other hand, in another type of solid oxide fuel cell, the fuel cell unit is constructed by forming a cathode electrode layer and an anode electrode layer on opposite surfaces of a solid oxide substrate, and an electromotive force is generated between the cathode electrode layer and the anode electrode layer by placing the fuel cell unit in a mixed gas atmosphere containing a fuel gas, for example, methane gas, and oxygen gas. The principle of generating an electromotive force between the cathode electrode layer and the anode electrode layer in this type of fuel cell is the same as that for the above-described separate-chamber type fuel cell but, as the whole fuel cell unit can be placed in substantially the same atmosphere, the fuel cell unit can be constructed as a single-chamber type unit to which the mixed gas is supplied, and this serves to increase the durability of the fuel cell unit.

However, in this single-chamber fuel cell also, as the fuel cell has to be operated at a high temperature of about 1000° C., there is the danger that the mixed gas may explode. Here, if the oxygen concentration is reduced to a level lower than the ignitability limit to avoid such danger, there occurs the problem that carbonization of the fuel, such as methane, progresses and the fuel cell performance degrades. In view of this, there is proposed a single-chamber fuel cell power generating apparatus that can use a mixed gas whose oxygen concentration is controlled so as to be able to prevent the progress of carbonization of the fuel, while at the same time, preventing an explosion of the mixed gas.

Figure 9:
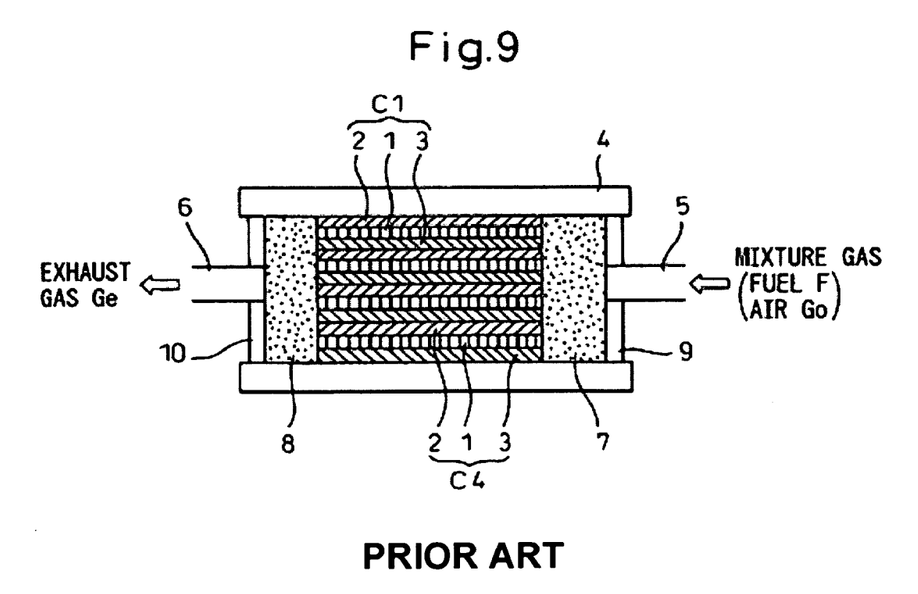
FIG. 9 is a diagram for explaining the construction of a power generating apparatus using a solid oxide fuel cell according to the prior art.

FIG. 9 shows the construction of the proposed single-chamber fuel cell power generating apparatus. The power generating apparatus shown in FIG. 9 is constructed by stacking a plurality of solid oxide fuel cell units, each containing a solid oxide substrate, one on top of another with each unit oriented parallel to the flow direction of the mixture gas. Each fuel cell unit comprises a solid oxide substrate 1 of a closely compacted structure and a cathode electrode layer 2 and an anode electrode layer 3 as porous layers formed on opposite surfaces of the solid oxide substrate 1, and the plurality of fuel cell units C1 to C4 of identical structure are stacked in a ceramic container 4. Then, the fuel cell units are hermetically sealed in the container 4, after adding fillers 7 and 8, by closing them with end plates 9 and 10. A heater for heating the fuel cell units is provided around the outer circumference of the container 4.

The container 4 is provided with a supply pipe 5 for supplying the mixture gas containing air Go and a fuel F such as methane, and an exhaust pipe 6 for the exhaust gas Ge. Vacant spaces in the container 4, where the mixture gas and the exhaust gas flow, i.e., the areas in the container 4 other than the area occupied by the fuel cell units, are filled with the fillers 7 and 8, and a suitable gap is provided therebetween, thereby preventing the mixture gas from igniting, even when a mixed gas within the ignitability limit is contained therein, when the fuel cells are operated.

Another fuel cell power generating apparatus has been proposed. In this fuel cell power generating apparatus, the space inside the container, except the space occupied by the fuel cell unit, is provided with explosion preventing means, and further, the exhaust gas exiting from the fuel cell unit is burned by a combustion device to ensure safe treatment of the exhaust gas. As a result, the oxygen concentration in the mixture gas can be increased (to reduce the fuel density), thus enhancing the power generation efficiency of the fuel cell unit while preventing further degradation of the fuel cell performance due to carbonization of the fuel contained in the mixture gas.

On the other hand, there has been proposed a fuel cell power generating apparatus in which the stack of the solid oxide fuel cell units shown in FIG. 9 is mounted vertically, and the exhaust pipe 6 and the end plate 10 at the top are removed, thereby changing the container 4 from the hermetically sealed type to the open type. The composition of the mixture gas supplied from the supply pipe 5 changes as the mixture gas flows downstream through the cathode electrode and anode electrode layers of the stacked fuel cell units; that is, the amount of oxygen decreases, and water ($H_2O$), carbon dioxide ($CO_2$), hydrogen ($H_2$), and carbon monoxide (CO) increase. However, due to the area size and reaction efficiency of the stacked fuel cell units, unreacted fuel gas is contained in the exhaust gas Ge discharged from the fuel cell units. As a result, the concentration of the fuel gas in the exhaust gas exiting from the filler layer 8 lies within the combustion range (i.e., within the ignitability limit) and is therefore sufficiently combustible.

Then, in the fuel cell power generating apparatus changed to the open type, the exhaust gas discharged from the fuel cell units is burned in the space created in the upper part of the container 4 by removing the end plate 10; this serves to ensure safe treatment of the fuel cell exhaust gas while prevention an explosion of the exhaust gas. When ignited immediately after exiting from the filler layers 8, the exhaust gas Ge burns in the upper space of the container 4, but the combustion does not occur within the filler layer 8, because the gap between the fillers in the filler layer 8 is set so that, even when a mixture gas within the ignitability limit is contained therein, the mixture gas cannot ignite.

For the fillers filled into the space of the fuel cell, use can be made of pulverized powders, porous structures, or capillaries formed from a metal or a ceramic stable under the operating conditions of the fuel cell. Such pulverized powders, porous structures, or capillaries can be formed from an alloy containing one or more kinds of metals selected from the group consisting of Ti, Cr, Te, Co, Ni, Cu, Al, Mo, Rh, Pd, Ag, W, Pt, and Au, or from a ceramic containing one or more kinds of materials selected from the group consisting of Mg, Al, Si, and Zr. Pulverized powders with a particle size of 50 µm to 1000 µm are preferable and, in the case of porous structures, structures with a porosity of not less than 50% is preferable. For capillaries, capillaries with an internal diameter of 100 µm to 200 µm can be used; long capillaries may be filled into the space by arranging them parallel to the flow direction of the mixture gas or exhaust gas, or short capillaries may be randomly filled into the space.

In this fuel cell power generating apparatus, it is possible to enhance the energy utilization efficiency by recovering part of the heat generated by the combustion of the exhaust gas by using a heat recovering means such as a heating coil provided in the combustion device. A heater is mounted around the outer circumference of the container to heat the solid oxide fuel cell units.

Figure 10:
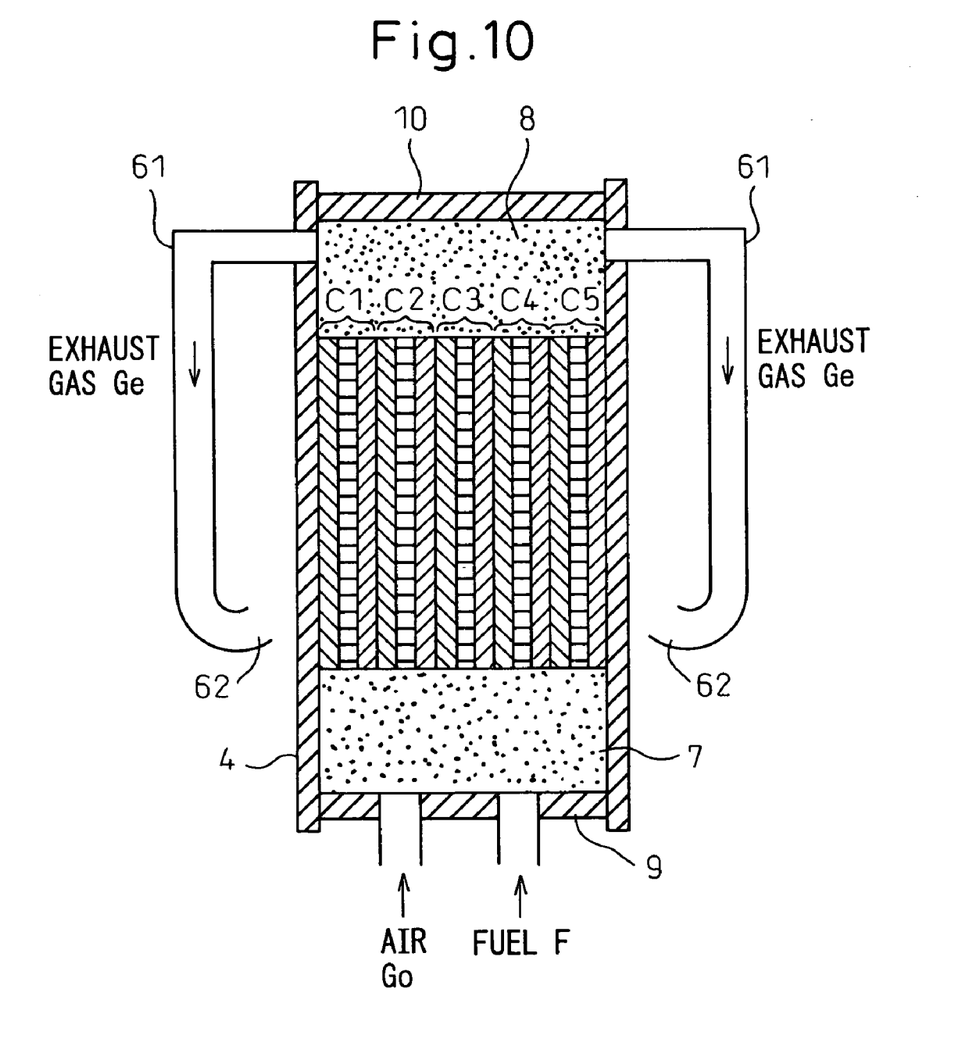
FIG. 10 is a diagram for explaining a power generating apparatus using a solid oxide fuel cell with modifications made to improve the method of heating the solid oxide fuel cell unit.

FIG. 10 shows the construction of the fuel cell power generating apparatus with modifications made to heat the solid oxide fuel cell units by the combustion device using the exhaust gas Ge, thereby eliminating the need for the heater. In the fuel cell power generating apparatus shown in FIG. 10, a plurality of fuel cell units C1 to C5, each identical in structure to the solid oxide fuel cell unit C shown in FIG. 8, are stacked vertically and housed in a container 4. As a whole, the fuel cell power generating apparatus shown in FIG. 10 is similar in construction to the fuel cell power generating apparatus shown in FIG. 9, but differs in that the fuel cell units are stacked in a vertical position.

Further, in the fuel cell power generating apparatus shown in FIG. 9, the exhaust pipe 6 was mounted to the end plate 10 but, in the fuel cell power generating apparatus shown in FIG. 10, exhaust pipes 61 and 62 are mounted extending outwardly of the container 4 from the upper part of the filler layer 8. In the example of FIG. 10, two exhaust pipes are installed, but the number of exhaust pipes should be suitably determined but must be not smaller than two; the plurality of exhaust pipes are arranged at equally spaced intervals around the outer circumference of the container 4.

The end of each of the exhaust pipes 61 and 62 is pointed toward the sidewall of the container 4 where the combustion device is mounted. The exhaust gas Ge exiting from the fuel cell units passes through the filler layer 8 and is introduced through the exhaust pipes 61 and 62 to their ends where the exhaust gas is burned. The heat produced by burning the exhaust gas Ge is used for heating the fuel cell housing section of the container 4. The area near the fuel cell units can thus be readily heated to the fuel cell operating temperature.

However, in this fuel cell power generating apparatus, because the combustion of the exhaust gas occurs outside the container, a special exhaust pipe and a special combustion device must be provided and, in addition to that, the container must be hermetically sealed, which makes it indispensable to provide the filler layer. As a result, the solid oxide fuel cell not only becomes complex in construction but its volume also increases.

In view of this, the solid oxide fuel cell power generating apparatus according to the present invention is constructed so that the exhaust gas can be treated safely while preventing the explosion of the exhaust gas within the fuel cell, so that the fuel cell unit can be readily heated to its operating temperature by the combustion of the exhaust gas, so that the construction of the solid oxide fuel cell can be simplified, and so that the power generation density per unit volume can be increased.

Next, first to sixth embodiments of the power generating apparatus using the solid oxide fuel cell according to the present invention will be described with reference to FIGS. 1 to 7. However, before proceeding to the description of the embodiments, the solid oxide fuel cell unit used in common in the embodiments will be described in detail below.

The solid oxide fuel cell unit used in the power generating apparatus of each embodiment is basically the same in structure as the solid oxide fuel cell unit C shown in FIG. 8, and comprises the solid oxide substrate 1, the cathode electrode layer 2, and the anode electrode layer 3. The solid oxide fuel cell used in the power generating apparatus of each embodiment is constructed by stacking a plurality of such solid oxide fuel cell units C.

The solid oxide substrate 1 is, for example, a flat rectangular plate, and the cathode electrode layer 2 and the anode electrode layer 3 are respectively formed over almost the entire surfaces of the flat solid oxide substrate 1 in such a manner as to face each other with the solid oxide substrate 1 interposed therebetween. A lead wire L1 is connected to the cathode electrode layer 2 and a lead wire L2 to the anode electrode layer 3, and the fuel cell output is taken between the lead wires L1 and L2. The solid oxide substrate 1 need only be formed in a plate-like shape, and need not be limited to the rectangular shape but can take any shape and size suitable for incorporation into the apparatus.

For the solid oxide substrate 1, known materials can be used, examples including the following:
  a) YSZ (yttria-stabilized zirconia), ScSZ (scandia-stabilized zirconia), and zirconia-based ceramics formed by doping these materials with Ce, Al, etc.
  b) SDC (samaria-doped ceria), GDC (gadolinium-doped ceria), and other ceria-based ceramics.
  c) LSGM (lanthanum gallate) and bismuth oxide-based ceramics.

For the anode electrode layer 3, known materials can be used, examples including the following:
  d) Cermet of nickel and a ceramic based on yttria-stabilized zirconia or scandia-stabilized zirconia or a ceramic based on ceria (SDC, GDC, YDC, etc.).
  e) Sintered material composed principally of electrically conductive oxide (50% to 99% by weight) (electrically conductive oxide is, for example, nickel oxide containing lithium in solid solution).

f) Material given in d) or e) to which a metal made of a platinum-group element or its oxide is added in an amount of about 1% to 10% by weight.

Of these materials, d) and e) are particularly preferable.

The sintered material composed principally of electrically conductive oxide given in e) has excellent oxidation resistance and, therefore, can prevent phenomena resulting from the oxidation of the anode electrode layer, such as delamination of the anode electrode layer from the solid oxide layer and degradation of power generation efficiency or inability to generate power due to the rise in the electrode resistance of the anode electrode layer. For the electrically conductive oxide, nickel oxide containing lithium in solid solution is preferable. It will also be noted that high power generation performance can be obtained by adding a metal made of a platinum-group element or its oxide to the material given in d) or e).

For the cathode electrode layer, known materials, which contain an element such as lanthanum selected from group III of the periodic table and doped with strontium (Sr), can be used. Examples include a manganic acid compound (for example, lanthanum strontium manganite), a gallium acid compound and a cobalt acid compound (for example, lanthanum strontium cobaltite and samarium strontium cobaltite).

The cathode electrode layer 2 and the anode electrode layer 3 are both formed in a porous structure. For these electrode layers, the porosity of the porous structure should be set to 20% or higher, preferably 30 to 70%, and more preferably 40 to 50%. In the solid oxide fuel cell unit used in the present invention, the cathode electrode layer 2 and the anode electrode layer 3, each formed in a porous structure, are placed vertically; therefore, the mixture gas must be introduced from the upper end of the structure and be passed through to the lower end thereof so that the mixture gas can be supplied to the entire surface of each electrode layer.

Unlike the solid oxide fuel cell power generating apparatuses shown in FIGS. 9 and 10, the filler layers that sandwich the solid oxide fuel cell units from both ends are not provided in the power generating apparatus of the present invention; therefore, when the fuel cell is operated, the oxygen concentration in the mixed gas passing through the solid oxide fuel cell units might be within the ignitability limit and the mixed gas may ignite. To prevent this, the vertical length of each solid oxide fuel cell unit is set so that the mixture gas cannot ignite. More specifically, the length of the fuel cell unit is chosen to be smaller than the quenching distance of the mixed gas within the ignitability limit and contained in the unit when the fuel cell is operated.

As a result, if the oxygen concentration in the mixture gas supplied to the solid oxide fuel cell unit increases up to the ignitability limit, ignition can be avoided. It is known that the quenching distance varies depending on the oxygen concentration in the mixture gas, pressure, etc.; therefore, the size and the porosity of the porous structure of each of the cathode electrode and anode electrode layers must be determined in accordance with the quenching distance of the mixture gas that is present when the fuel cell is operated, and it is preferable to obtain the values experimentally.

The solid oxide substrate 1 can also be formed as a porous structure. If the solid oxide substrate was formed as a closely compacted structure, its thermal shock resistance would drop, and the substrate would tend to crack when subjected to abrupt temperature changes. Furthermore, as the solid oxide substrate is generally formed thicker than the anode electrode layer and the cathode electrode layer, any crack occurring in the solid oxide substrate would lead to the formation of cracks in the entire structure of the solid oxide fuel cell which would eventually disintegrate.

When the solid oxide substrate is formed as a porous structure, its thermal shock resistance increases, and defects such as cracking do not occur even when the substrate is subjected to abrupt temperature changes or to a heat cycle involving rapid changes in temperature during power generation. Further, when the porous structure was fabricated with a porosity of less 10%, no appreciable improvement in thermal shock resistance was observed, but when the porosity was 10% or higher, good thermal shock resistance was observed, and a better result was obtained when the porosity was increased to 20% or higher. This is presumably because, when the solid oxide substrate is formed in a porous structure, thermal expansion due to heating is absorbed by the pores in the porous structure.

The solid oxide fuel cell unit is fabricated, for example, in the following manner. First, powders of materials for forming the solid oxide substrate are mixed in prescribed proportions, and the mixture is molded into a flat plate-like shape. After that, the flat plate-like structure is calcined and sintered to produce the solid oxide layer which serves as the substrate. Here, by adjusting the kinds and proportions of the powder materials including a pore-forming agent and the calcination conditions such as calcination temperature, calcination time, preliminary calcination, etc., solid oxide substrates with various porosities can be produced. A paste is applied in the shape of a cathode electrode layer on one surface of the substrate thus obtained as the solid oxide layer, and a paste is applied in the shape of an anode electrode layer on the other surface thereof; thereafter, the entire structure is calcined to complete the fabrication of a single solid oxide fuel cell unit.

The durability of the solid oxide fuel cell unit can be further increased. In this durability increasing method, a metal mesh is embedded in or fixed to each of the cathode electrode and anode electrode layers of the fuel cell unit. In the case of the embedding method, the material (paste) for forming each layer is applied over the solid oxide substrate, and the metal mesh is embedded in the thus applied material, which is then calcined. In the case of the fixing method, the metal mesh is not completely embedded in each layer material but may be fixed on a surface of it, followed by sintering.

For the metal mesh, a material that has excellent heat resistance, and that well matches the thermal expansion coefficient of the cathode electrode layer and anode electrode layer which the metal mesh is to be embedded in or fixed to, is preferred. Specific examples include a platinum metal and a platinum-containing metal alloy formed in the shape of a mesh. Alternatively, stainless steel of SUS 300 series (304, 316, etc.) or SUS 400 series (430, etc.) may be used as these materials are advantageous in terms of cost.

Instead of using the metal mesh, metal wires may be embedded in or fixed to the anode electrode layer and the cathode electrode layer. The metal wires are formed using the same metal material as that used for the metal meshes, and the number of wires and the configuration of the wire arrangement are not limited to any particular number or configuration. The metal meshes or metal wires embedded in or fixed to the anode electrode layer and the cathode electrode layer serve to reinforce the structure so that the solid oxide substrate, if cracked due to its thermal history, etc., will not disintegrate into pieces; furthermore, the metal meshes or the metal wires act to electrically connect cracked portions.

The above description has been given by dealing with the case where the solid oxide substrate is formed in a porous structure, but it will be recognized that the solid oxide substrate of the fuel cell may instead be formed in a closely compacted structure; in that case, the metal meshes or the metal wires embedded in or fixed to the cathode electrode layer and the anode electrode layer provide particularly effective means to cope with the problem of cracking due to thermal history.

The metal meshes or the metal wires may be provided in both the anode electrode layer and the cathode electrode layer or in either one of the layers. Further, the metal meshes and the metal wires may be used in combination. When the metal meshes or the metal wires are embedded at least in the anode electrode layer, then if cracking occurs due to thermal history, the power generation performance of the fuel cell does not degrade and the fuel cell can continue to generate power. As the power generation performance of the solid oxide fuel cell unit is largely dependent on the effective area of the anode electrode layer as the fuel electrode, the metal meshes or the metal wires should be provided at least in the anode electrode layer.

As described above, the solid oxide fuel cell unit used in common between the embodiments of the power generating apparatus using the solid oxide fuel cell according to the present invention is basically the same in structure as the earlier described solid oxide fuel cell unit C, and comprises the solid oxide substrate 1, the cathode electrode layer 2, and the anode electrode layer 3, and the solid oxide fuel cell is constructed by housing a single solid oxide fuel cell unit C or a stack of such solid oxide fuel cell units in a cylindrical container. The first to sixth embodiments of the power generating apparatus using the solid oxide fuel cell and be described below differ in the way in which the solid oxide fuel cell unit or units are housed in the container.

Embodiment 1

Figure 1:
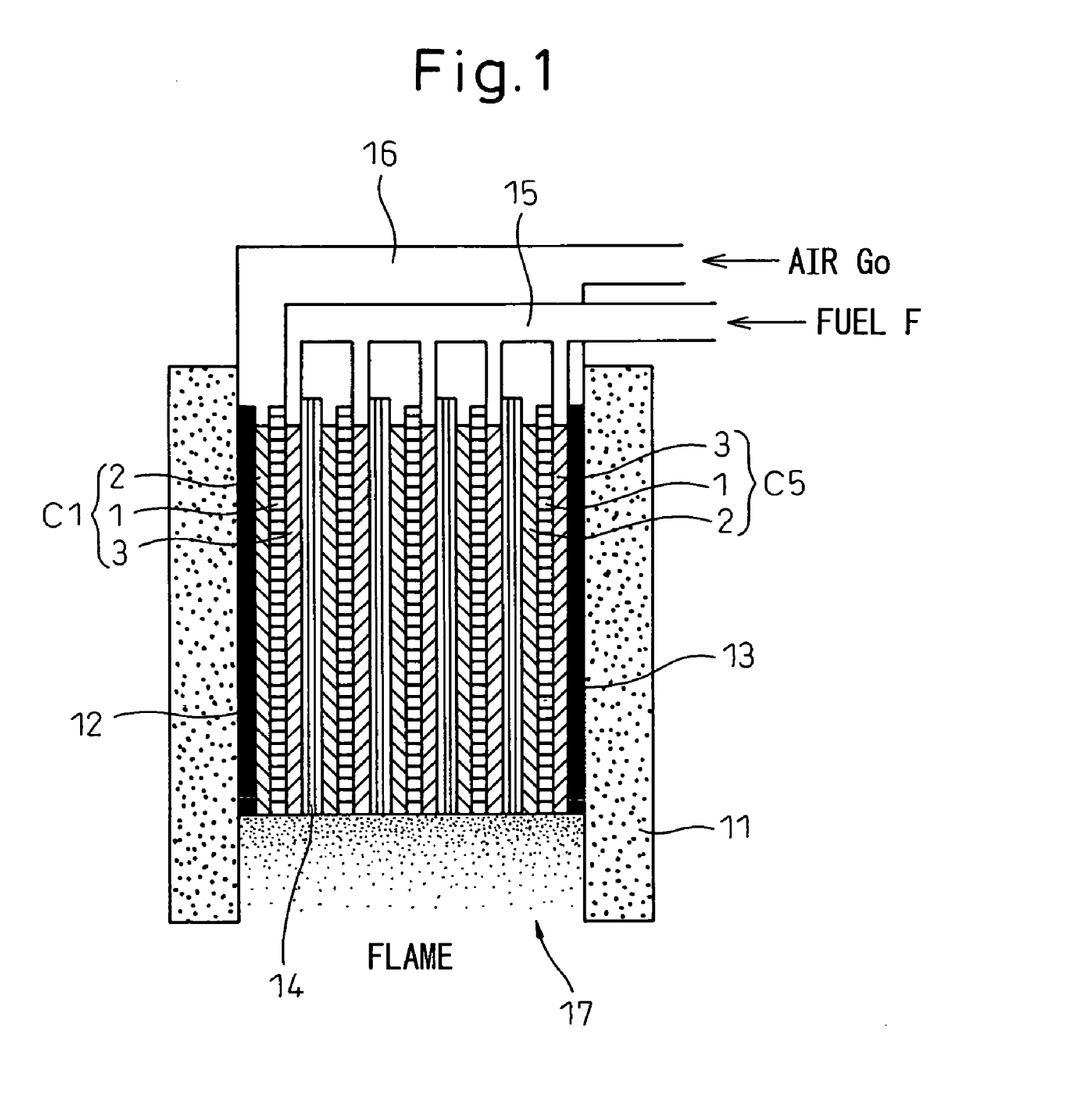
FIG. 1 is a diagram for explaining a first embodiment of a power generating apparatus using a solid oxide fuel cell according to the present invention.

The first embodiment concerns the case in which, in each of the plurality of solid oxide fuel cell units, air is supplied to the cathode electrode layer and fuel is supplied to the anode electrode layer separately from each other. FIG. 1 shows the power generating apparatus using the solid oxide fuel cell according to the first embodiment.

In the power generating apparatus using the solid oxide fuel cell shown in FIG. 1, a plurality of solid oxide fuel cell units, each identical to the one shown in FIG. 8, are arranged in layers, and the same parts as those previously shown are designated by the same reference numerals. In the figure, five solid oxide fuel cell units C1 to C5 each having the same rectangular shape are stacked in a vertical position and housed inside a wall structure 11 formed from a heat insulator layer. The number of solid oxide fuel cell units is not limited to five, but one or more fuel cell units can be used, the number being chosen according to the voltage value or current value to be extracted for output.

In the first embodiment, a plate-like separator layer 14 is inserted between each solid oxide fuel cell unit so that the air and the fuel can be supplied separately to the cathode electrode layer and the anode electrode layer, respectively, in each solid oxide fuel cell unit. The solid oxide fuel cell units C1 to C5 and the separator layers together constitute a solid oxide fuel cell unit array, and current collecting layers 12 and 13 are placed on opposites sides of the solid oxide fuel cell unit array. The wall structure 11 houses the solid oxide fuel cell unit array in such a manner as to encircle it, and a space is formed above the upper end of the solid oxide fuel cell unit array as well as below the lower end thereof. The current collecting layers formed on the opposites sides are provided to extract the output of the solid oxide fuel cell unit array.

Devices for supplying the fuel F and the air Go are provided in the space formed above the upper end of the solid oxide fuel cell unit array. That is, the fuel supply device 15 is provided that supplies the fuel F only to the anode electrode layers 3 of the solid oxide fuel cell units C1 to C5. The air supply device 16 is mounted in such a manner as to cover the space above the upper end of the solid oxide fuel cell unit array. The fuel F is supplied to each anode electrode layer 3 from the upper end toward the lower end thereof, thus keeping the anode electrode layer side in a fuel-rich condition, and the air Go is supplied to each cathode electrode layer 2 from the upper end toward the lower end thereof, thus keeping the cathode electrode layer side in an oxygen-rich condition.

The separator layers 14 inserted in the solid oxide fuel cell unit array are provided in order to create a fuel-rich condition and an oxygen-rich condition, separately from each other, in each solid oxide fuel cell unit; each separator layer 14 is formed from an electrically conductive material or an electrically insulating material. When the separator layers 14 are formed from an electrically conductive material, the solid oxide fuel cell units C1 to C5 are connected in series, and when the separator layers 14 are formed from an electrically insulating material, the solid oxide fuel cell units C1 to C5 can be connected in parallel or in series by using the lead wires L1 and L2.

On the other hand, a combustion device 17 having an igniter (not shown) is provided in the space formed below the lower end of the solid oxide fuel cell unit array. When operating the fuel cell, the air Go is fed into this lower end space through the cathode electrode layers 2 of the solid oxide fuel cell units C1 to C5, while the fuel F is supplied there through the anode electrode layers 3, and the fuel F is burned by the combustion device 17, producing a flame. With this flame, the solid oxide fuel cell unit array is heated to a temperature at which the fuel cell can be operated to generate power.

After the power generating operation of the solid oxide fuel cell unit array is started, any residual fuel, remaining unconsumed by the solid oxide fuel cell unit array, flows out of the lower end of the solid oxide fuel cell unit array, and the oxygen that passed through the cathode electrode layers 2 and that did not contribute to power generation also flows out of the lower end; therefore, the exhaust gas from the solid oxide fuel cell unit array is safely burned by the combustion device 17 for treatment.

As described above, according to the construction of the power generating apparatus that uses the solid oxide fuel cell according to the first embodiment, as the air and fuel are supplied from the upper end of the solid oxide fuel cell unit array, and the exhaust gas is burned at the lower end of the solid oxide fuel cell unit array, not only can the container of the solid oxide fuel cell be constructed in an open-type structure and the apparatus be simplified in construction, but also the thermal energy generated by the combustion of the exhaust gas can be effectively utilized. Furthermore, the exhaust gas can be treated easily and safely.

Embodiment 2

Figure 2:
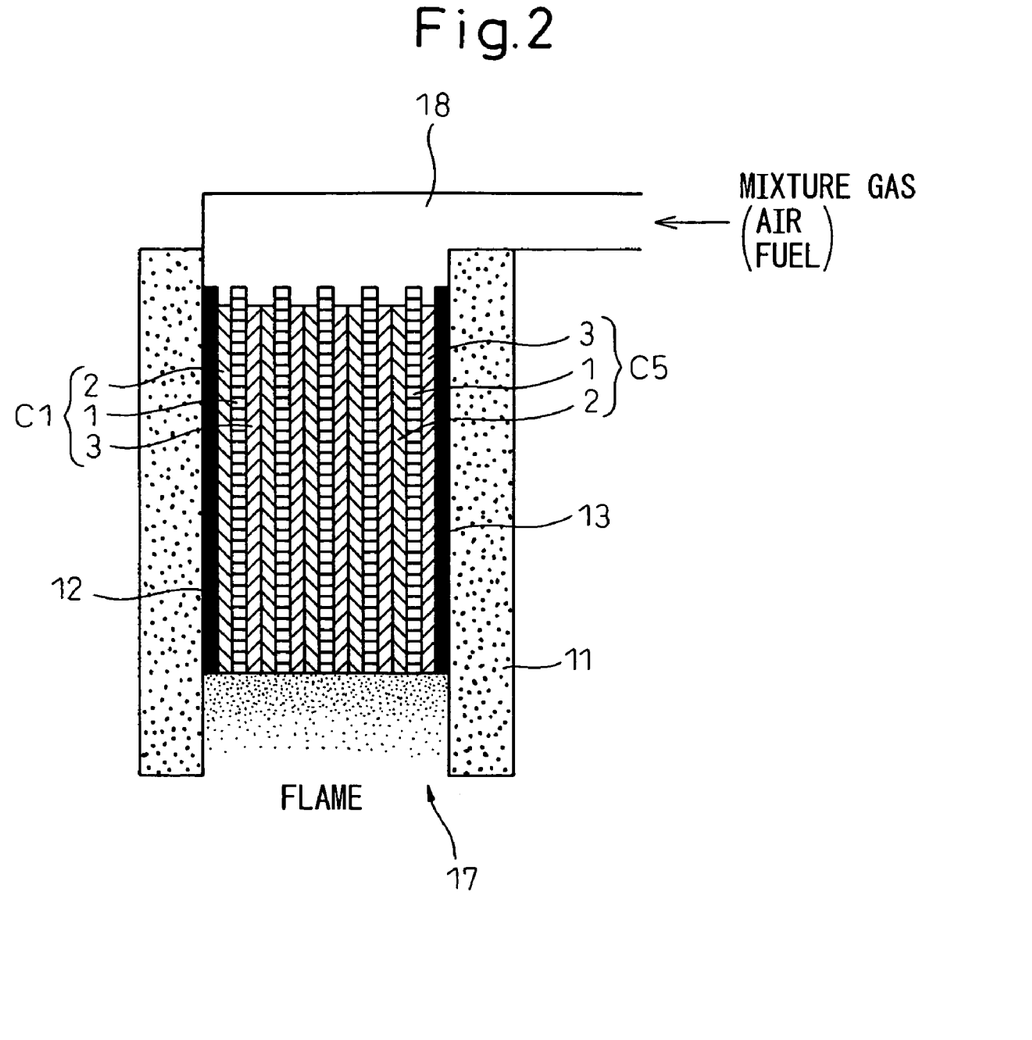
FIG. 2 is a diagram for explaining a second embodiment of a power generating apparatus using a solid oxide fuel cell according to the present invention.

While the first embodiment has dealt with the case in which, in each solid oxide fuel cell unit, the air and the fuel are respectively supplied to the cathode electrode layer and the anode electrode layer separately from each other, the second embodiment concerns the case of the solid oxide fuel cell in which a mixture gas of air and fuel is supplied to the solid oxide fuel cell unit array. FIG. 2 shows the construction of the power generating apparatus that uses the solid oxide fuel cell according to the second embodiment.

In common with the first embodiment, the power generating apparatus using the solid oxide fuel cell shown in FIG. 2 comprises five solid oxide fuel cell units C1 to C5 each having the same rectangular shape, which are stacked in a vertical position and housed inside the cylindrical wall structure 11 formed from a heat insulator layer. However, unlike the case of the first embodiment, in the power generating apparatus using the solid oxide fuel cell according to the second embodiment, as the mixture gas is supplied to the solid oxide fuel cell unit array, there is no need to insert a separator layer between each solid oxide fuel cell unit, and as a result, the cathode electrode layer or anode electrode layer of each solid oxide fuel cell unit contacts the anode electrode layer or cathode electrode layer of its adjacent solid oxide fuel cell unit in surface-to-surface contacting relationship.

The solid oxide fuel cell units C1 to C5 constitute the solid oxide fuel cell unit array. The solid oxide fuel cell unit array is enclosed by the wall structure 11. A mixture gas supply device 18 is mounted in the space formed above the upper end of the solid oxide fuel cell unit array and inside the wall structure 11. The mixture gas is supplied from above the upper end of the solid oxide fuel cell unit array. The supplied mixture gas passes through the cathode electrode layer 2 and the anode electrode layer 3 in each solid oxide fuel cell unit.

The mixture gas, after passing through the cathode electrode layer 2 and the anode electrode layer 3 in each solid oxide fuel cell unit, is fed into the space formed below the lower end of the solid oxide fuel cell unit array and is burned in this space by the combustion device 17. Any residual fuel and oxygen, remaining unconsumed by the fuel cell for power generation, also flow out of the lower end of the solid oxide fuel cell unit array and is burned by the combustion device 17.

When operating the fuel cell, the mixture gas is fed into the bottom space by passing through the cathode electrode layers 2 and the anode electrode layers 3 of the solid oxide fuel cell units C1 to C5, and the fuel F contained in the mixture gas is burned by the combustion device 17 with the aid of the air Go, producing a flame. With this flame, the solid oxide fuel cell unit array is heated to a temperature at which the fuel cell can be operated to generate power.

After the power generating operation of the solid oxide fuel cell unit array is started, any residual fuel, remaining unconsumed by the solid oxide fuel cell unit array, flows out of the lower end of the solid oxide fuel cell unit array and, at the same time, the oxygen that did not contribute to power generation also flows out of the lower end; therefore, the exhaust gas from the solid oxide fuel cell unit array is safely burned by the combustion device 17 for treatment.

As described above, according to the construction of the power generating apparatus that uses the solid oxide fuel cell according to the second embodiment, as the mixture gas is supplied from the upper end of the solid oxide fuel cell unit array, and the exhaust gas is burned at the lower end of the solid oxide fuel cell unit array, the container of the solid oxide fuel cell can be constructed in an open-type structure, and the apparatus can be simplified in construction. Furthermore, the thermal energy generated by the combustion of the exhaust gas can be effectively utilized, and also the exhaust gas can be treated easily and safely.

Embodiment 3

The second embodiment showed the case of the solid oxide fuel cell in which the air-fuel mixture gas is supplied to the solid oxide fuel cell unit array, and the cathode electrode layer or anode electrode layer of each solid oxide fuel cell unit contacts the anode electrode layer or cathode electrode layer of its adjacent solid oxide fuel cell unit in surface-to-surface contacting relationship. However, as the cathode electrode layer and the anode electrode layer contact each other in a surface-to-surface contacting relationship, contact resistance occurs, and this can cause a degradation of the electric current collecting efficiency for the power generation of the fuel cell units. Furthermore, there is a limit to the degree to which the power generation efficiency can be improved, because the mixture gas cannot be supplied efficiently over the entire surfaces of the cathode electrode and anode electrode layers.

Figure 3:
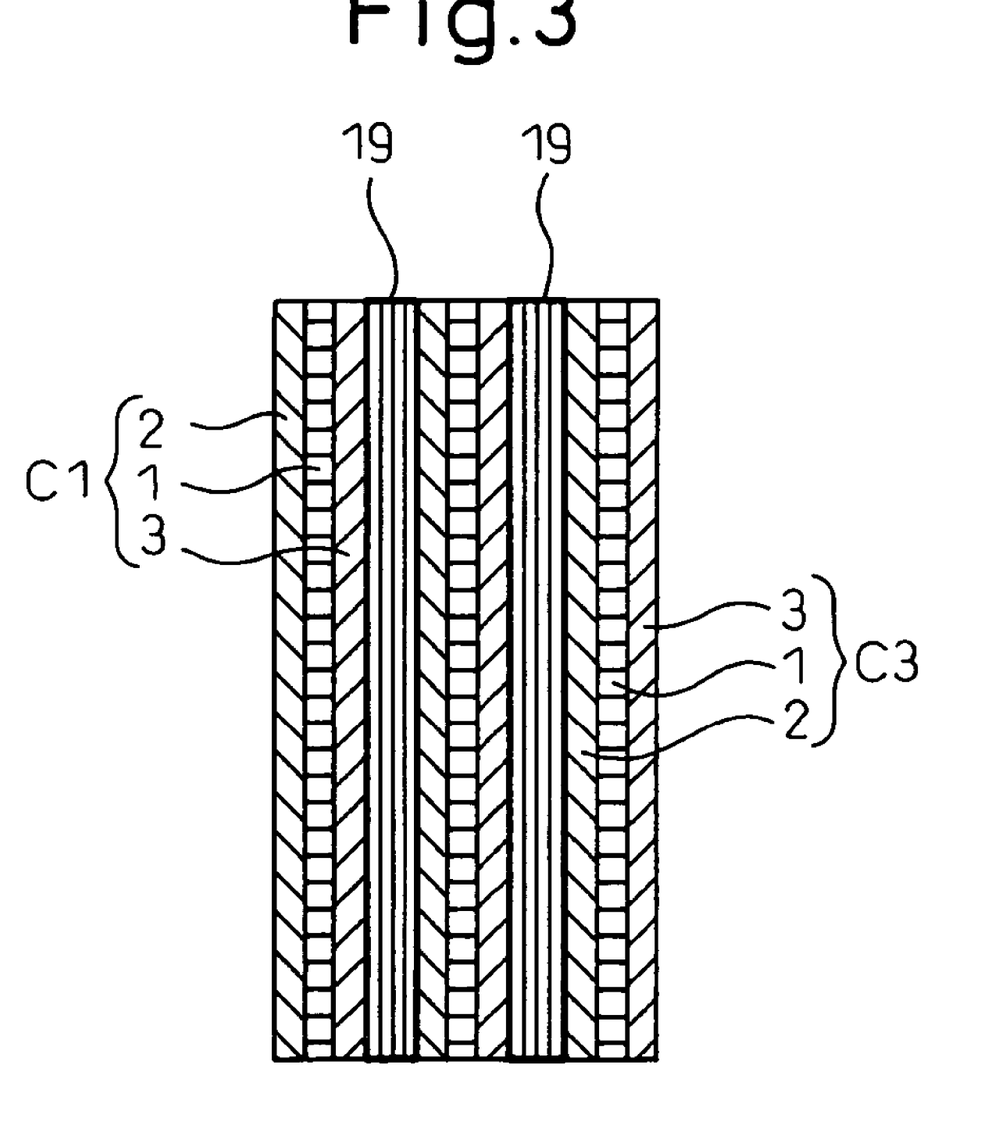
FIG. 3 is a diagram for explaining a third embodiment of a power generating apparatus using a solid oxide fuel cell according to the present invention.

In view of the above, in the power generating apparatus using the solid oxide fuel cell according to the third embodiment, a gas-permeable electrically conductive layer is inserted between each of the solid oxide fuel cell units C 1 to C 5 and its neighbor; otherwise, the construction is the same as that of the fuel cell power generating apparatus of the second embodiment shown in FIG. 2. FIG. 3 shows a portion of the solid oxide fuel cell unit array with the gas-permeable electrically conductive layer inserted between each solid oxide fuel cell unit and its neighbor. The same parts as those in the solid oxide fuel cell unit array shown in FIG. 2 are designated by the same reference numerals.

The gas-permeable electrically conductive layers 19 having the same shape as the electrode layer of each solid oxide fuel cell unit are each inserted between the cathode electrode layer 2 of one solid oxide fuel cell unit and the anode electrode layer 3 of its neighboring solid oxide fuel cell unit. Each gas-permeable electrically conductive layer 19 can be formed from a metal or conductive ceramic porous structure so that the mixture gas can be supplied from the upper end through to the lower end of the solid oxide fuel cell unit array.

Alternatively, the electrically conductive layer 19 may be formed from a metal or conductive ceramic plate with vertically extending grooves formed on both sides thereof. Further, it may be formed from a plate corrugated at right angles to the vertical direction. Alternatively, the electrically conductive layer 19 itself may be formed from a metal or carbon woven fabric.

As described above, according to the construction of the power generating apparatus that uses the solid oxide fuel cell according to the third embodiment, as the gas-permeable electrically conductive layers are inserted in the solid oxide fuel cell unit array to enable the mixture gas to be supplied effectively from the upper end of the solid oxide fuel cell unit array, and the exhaust gas is burned at the lower end of the solid oxide fuel cell unit array, not only can the container of the solid oxide fuel cell be constructed in an open-type structure and the apparatus be simplified in construction, but also the power generation efficiency of the fuel cell can be increased. Furthermore, the thermal energy generated by the combustion of the exhaust gas can be effectively utilized, and also the exhaust gas can be treated easily and safely.

Embodiment 4

In each of the second and third embodiments, the power generating apparatus using the solid oxide fuel cell has been constructed by stacking the plurality of solid oxide fuel cell units as a single solid oxide fuel cell unit array within the wall structure. In the fourth embodiment, the solid oxide fuel cell is constructed from a plurality of solid oxide fuel cell unit arrays, one construction example of which is shown in FIG. 4.

Figure 4:
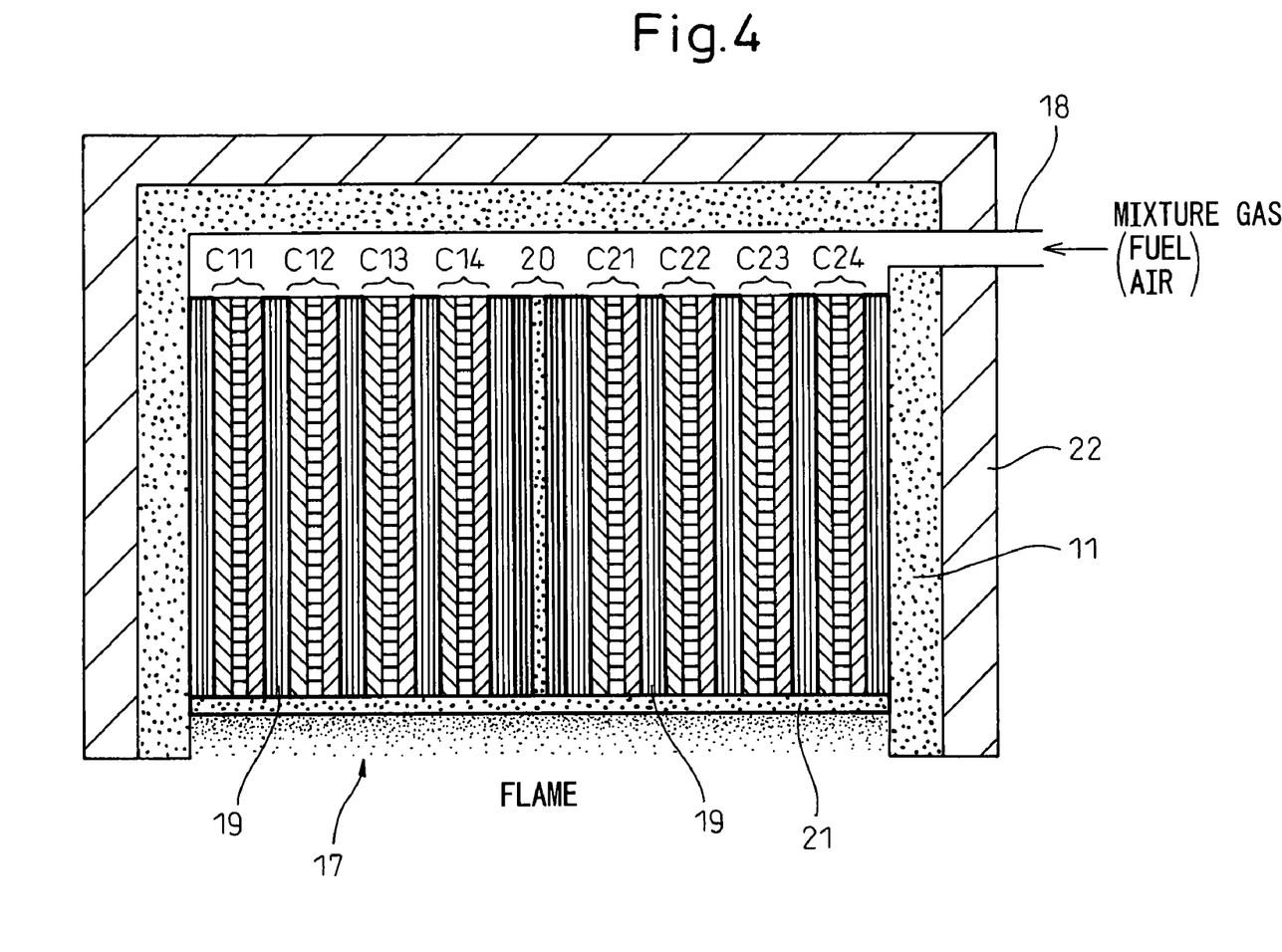
FIG. 4 is a diagram for explaining a fourth embodiment of a power generating apparatus using a solid oxide fuel cell according to the present invention.

The power generating apparatus using the solid oxide fuel cell shown in FIG. 4 comprises two solid oxide fuel cell unit arrays. Each solid oxide fuel cell unit array is identical in construction to the solid oxide fuel cell unit array of the third embodiment shown in FIG. 3; one solid oxide fuel cell unit array is constructed from a stack of a plurality of solid oxide fuel cell units C 11 to C 14, and the other is constructed from a stack of a plurality of solid oxide fuel cell units C 21 to C 24. The gas-permeable electrically conductive layer 19 is inserted between each solid oxide fuel cell unit.

Figure 5:
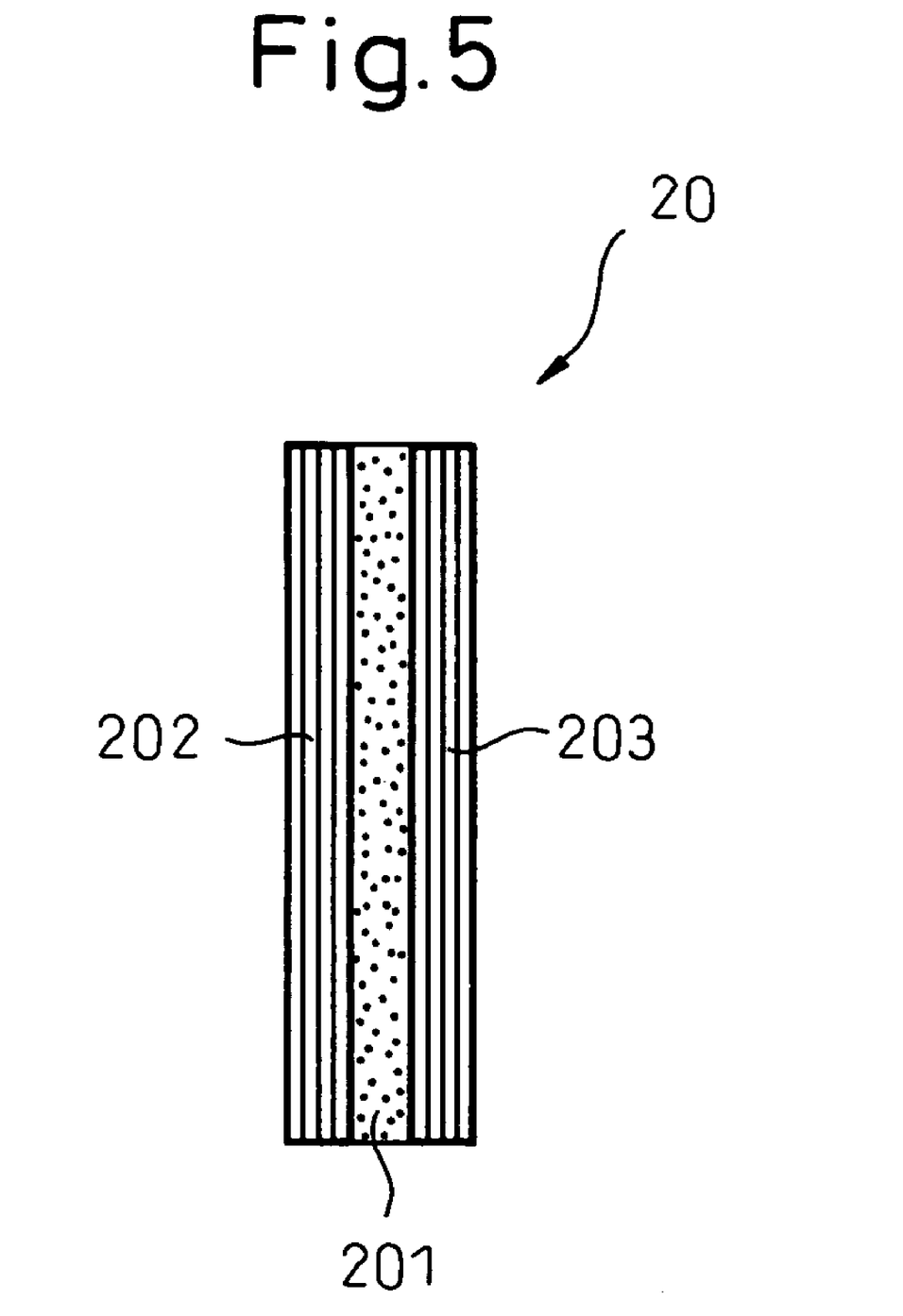
FIG. 5 is a diagram for explaining a specific example of an electrically insulating intervening layer used in the fourth embodiment.

The thus constructed two solid oxide fuel cell unit arrays are housed inside the wall structure 11 in such a manner as to be encircled by it. An electrically insulating intervening layer 20 shown in FIG. 5 is placed between the two solid oxide fuel cell unit arrays which are thus electrically isolated from each other. FIG. 4 has shown as an example the construction comprising two solid oxide fuel cell unit arrays, but three or more solid oxide fuel cell unit arrays may be used. Further, the solid oxide fuel cell unit array of the second embodiment that does not have a gas-permeable electrically conductive layer may be employed for each solid oxide fuel cell unit array.

As shown in FIG. 5, the electrically insulating intervening layer 20 comprises an electrically insulating substrate 201 and electrically conductive layers 202 and 203. The electrically insulating intervening layer 20 is formed in the same shape as the solid oxide fuel cell unit. The electrically insulating intervening layer 20 has the function of electrically isolating the two solid oxide fuel cell unit arrays from each other, and the electrically conductive layers 202 and 203 are formed on opposite surfaces of the electrically insulating substrate 201 to facilitate the current collection from the two solid oxide fuel cell unit arrays. It is possible to connect the electric outputs of the two solid oxide fuel cell unit arrays in parallel.

The two solid oxide fuel cell unit arrays with the electrically insulating intervening layer 20 interposed therebetween are stacked together and housed inside the wall structure 11, as shown in FIG. 4, and a space is formed above the stack of the two solid oxide fuel cell unit arrays as well as below it. The mixture fuel gas supply device 18 is mounted in the upper end space, and the mixture gas is supplied simultaneously to the two solid oxide fuel cell unit arrays. The mixture gas is supplied to each solid oxide fuel cell unit from above the upper end thereof.

The combustion device 17 having an igniter (not shown) is disposed in the space formed below the two solid oxide fuel cell unit arrays within the wall structure 11; in this space, the exhaust gas or the mixture gas passed through each solid oxide fuel cell unit is burned, producing a flame. In the solid oxide fuel cell of FIG. 4, an electrically insulating porous layer 21 is formed covering the entire bottom surfaces of the two solid oxide fuel cell unit arrays so that a uniform flame can be produced.

When operating the fuel cell, the mixture gas is fed into the lower end space through the cathode electrode layers 2 and the anode electrode layers 3 of the solid oxide fuel cell unit arrays, and the fuel F contained in the mixture gas is burned by the combustion device 17 with the aid of the air Go, producing a flame. With this flame, the solid oxide fuel cell unit arrays are heated to a temperature at which the fuel cell can be operated to generate power.

After the power generating operation of the solid oxide fuel cell unit arrays is started, any residual fuel, remaining unconsumed by each solid oxide fuel cell unit array, flows out of the lower end of the solid oxide fuel cell unit array and, at the same time, the oxygen that did not contribute to power generation also flows out of the lower end; therefore, the exhaust gas from the solid oxide fuel cell unit array is safely burned by the combustion device 17 for treatment.

Further, as shown in FIG. 4, a cooling device 22 is provided on the outside of the wall structure 11 of the fuel cell power generating apparatus. The cooling device 22 is, for example, a pipe capable of passing a coolant such as water therethrough; this pipe is installed around the wall structure 11. In this cooling device 22, the heat generated during the power generation of the solid oxide fuel cell unit arrays is transferred to the coolant, and this heat is extracted outside the apparatus and utilized.

As described above, according to the construction of the power generating apparatus that uses the solid oxide fuel cell according to the fourth embodiment, as the electrically insulating intervening layer is interposed between the solid oxide fuel cell unit arrays, the embodiment not only offers the same effect as achieved in the third embodiment but also offers the effect of simplifying the parallel connection of the solid oxide fuel cell unit arrays.

Embodiment 5

In the fourth embodiment, the electrically insulating intervening layer was placed between the plurality of fuel cell unit arrays, and the plurality of fuel cell unit arrays were stacked side by side inside the wall structure by interposing the electrically insulating intervening layer between the fuel cell unit arrays. In the fifth embodiment, on the other hand, the solid oxide fuel cell is constructed by stacking a plurality of fuel cell unit arrays on one top of the other with an electrically insulating porous layer interposed therebetween, one construction example of which is shown in FIG. 6.

Figure 6:
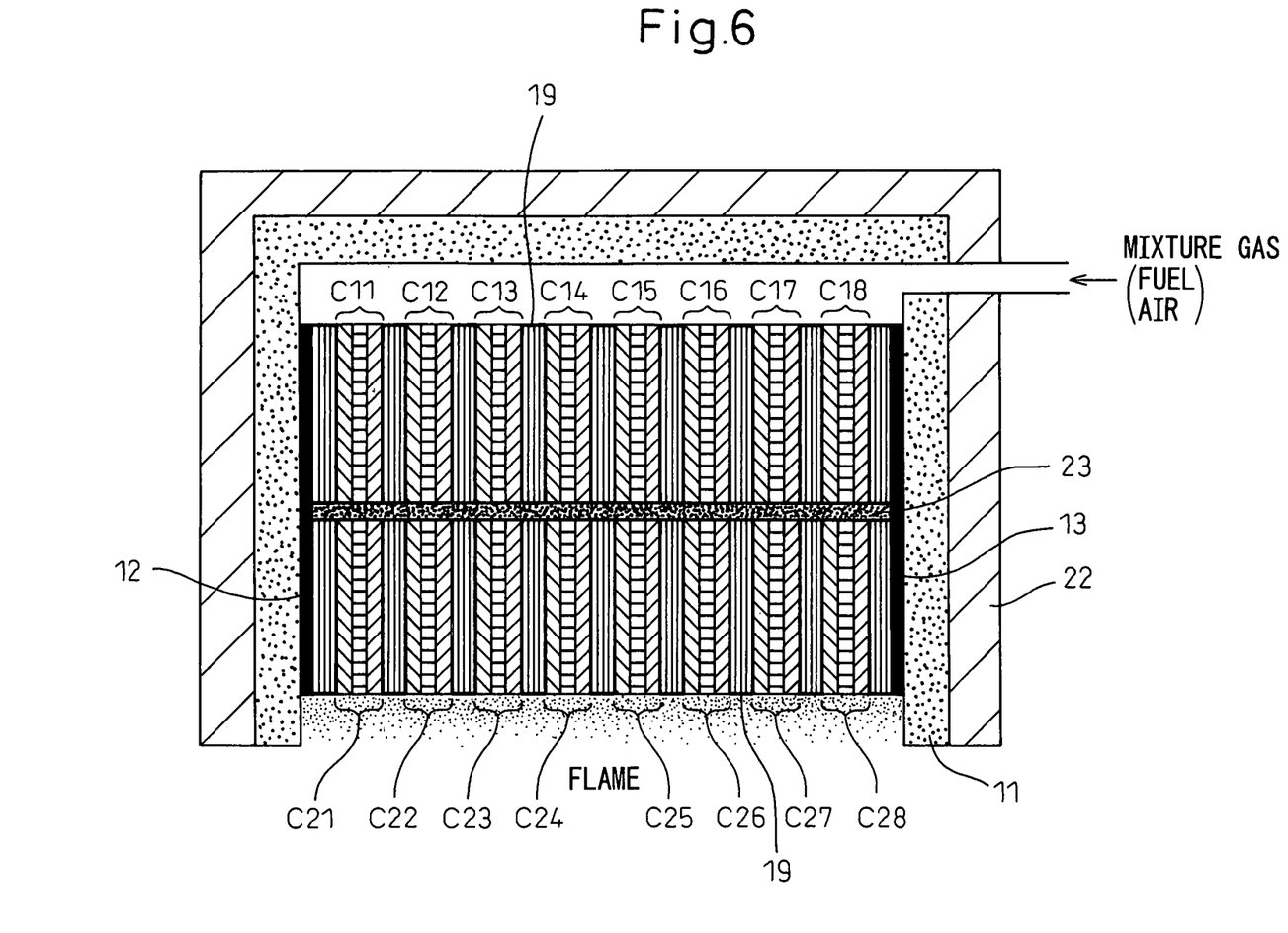
FIG. 6 is a diagram for explaining a fifth embodiment of a power generating apparatus using a solid oxide fuel cell according to the present invention.

The power generating apparatus using the solid oxide fuel cell shown in FIG. 6 comprises two solid oxide fuel cell unit arrays. Each solid oxide fuel cell unit array is similar in construction to the solid oxide fuel cell unit array of the third embodiment shown in FIG. 3; the first solid oxide fuel cell unit array in the upper part is constructed from a stack of a plurality of solid oxide fuel cell units C11 to C18, and the second solid oxide fuel cell unit array in the lower part is constructed from a stack of a plurality of solid oxide fuel cell units C21 to C28. A gas-permeable electrically conductive layer 19 is inserted between each of the stacked solid oxide fuel cell units and its neighbor.

The electrically insulating porous layer 23, extending in a direction at right angles to the vertical direction in which the solid oxide fuel cell units are oriented, is interposed between the first solid oxide fuel cell unit array and the second solid oxide fuel cell unit array; as shown in FIG. 6, the upper surface of the electrically insulating porous layer 23 is in contact with the lower surface of the first solid oxide fuel cell unit array, while the lower surface of the electrically insulating porous layer 23 is in contact with the upper surface of the second solid oxide fuel cell unit array.

The first and second solid oxide fuel cell unit arrays are housed inside the wall structure 11 with current collecting layers 12 and 13 interposed between the wall structure 11 and the respective arrays. The first and second solid oxide fuel cell unit arrays are electrically connected in parallel by the current collecting layers 12 and 13. A space is formed above the first solid oxide fuel cell unit array as well as below the second solid oxide fuel cell unit array. The mixture gas supply device 18 is provided in the upper space. The mixture gas is supplied to the upper surface of the first solid oxide fuel cell unit array, and the mixture gas is thus fed into each solid oxide fuel cell through the upper end thereof.

The combustion device 17 having an igniter (not shown) is disposed in the space formed below the second solid oxide fuel cell unit array within the wall structure 11; in this lower end space, a flame is produced by burning the exhaust gas or the mixture gas that has passed through the first solid oxide fuel cell unit array and then through the electrically insulating porous layer 23 and the second solid oxide fuel cell unit array. In the solid oxide fuel cell of FIG. 6 also, an electrically insulating porous layer may be formed on the bottom surface of the second solid oxide fuel cell unit array, as in the fourth embodiment.

When operating the fuel cell, the mixture gas is fed into the lower end space through the cathode electrode layers 2 and the anode electrode layers 3 of the upper and lower solid oxide fuel cell unit arrays, and the fuel F contained in the mixture gas is burned by the combustion device 17 with the aid of the air Go, producing a flame. With this flame, the first and second solid oxide fuel cell unit arrays are heated to a temperature at which the fuel cell can be operated to generate power.

After the power generating operation of the first and second solid oxide fuel cell unit arrays is started, any residual fuel, remaining unconsumed by the solid oxide fuel cell unit arrays, flows out of the lower end of the second solid oxide fuel cell unit array, and at the same time, the oxygen that did not contribute to power generation also flows out of the lower end; therefore, the exhaust gas from the first and second solid oxide fuel cell unit arrays is safely burned by the combustion device 17 for treatment.

In the fifth embodiment also, a cooling device 22 is provided on the outside of the wall structure 11 of the fuel cell power generating apparatus, as shown in FIG. 6. The cooling device 22 is, for example, a pipe capable of passing a coolant such as water therethrough; this pipe is installed around the wall structure 11. In this cooling device 22, the heat generated during the power generation of the first and second solid oxide fuel cell unit arrays is transferred to the coolant, and this heat is extracted outside the apparatus and utilized.

As described above, according to the construction of the power generating apparatus that uses the solid oxide fuel cell according to the fifth embodiment, as the electrically insulating porous layer is interposed between the upper and lower solid oxide fuel cell unit arrays, the embodiment not only offers the same effect as achieved in the third embodiment but also offers the effect of simplifying the parallel connection of the solid oxide fuel cell unit arrays; furthermore, the power output of the fuel cell can be easily increased by stacking any additional solid oxide fuel cell unit arrays by interposing an electrically insulating porous layer between each array.

Embodiment 6

In the second to fifth embodiments of the power generating apparatus using the solid oxide fuel cell, the flat plate solid oxide fuel cell unit formed, for example, in a rectangular shape as shown in FIG. 8, has been used as the basic unit, and each solid oxide fuel cell unit array has been constructed by stacking a plurality of such solid oxide fuel cell units. In the sixth embodiment, the power generating apparatus is not constructed by stacking a plurality of solid oxide fuel cell units, but is constructed by spirally winding a single rectangular flat plate solid oxide fuel cell unit around a vertical axis.

Figure 7A:
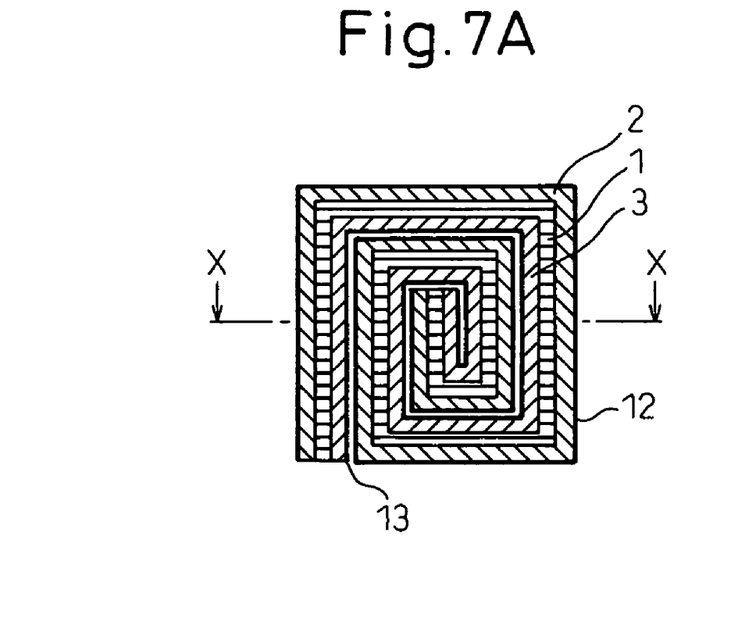
FIGS. 7A and 7B are diagrams for explaining a sixth embodiment of a power generating apparatus using a solid oxide fuel cell according to the present invention.
Figure 7B:
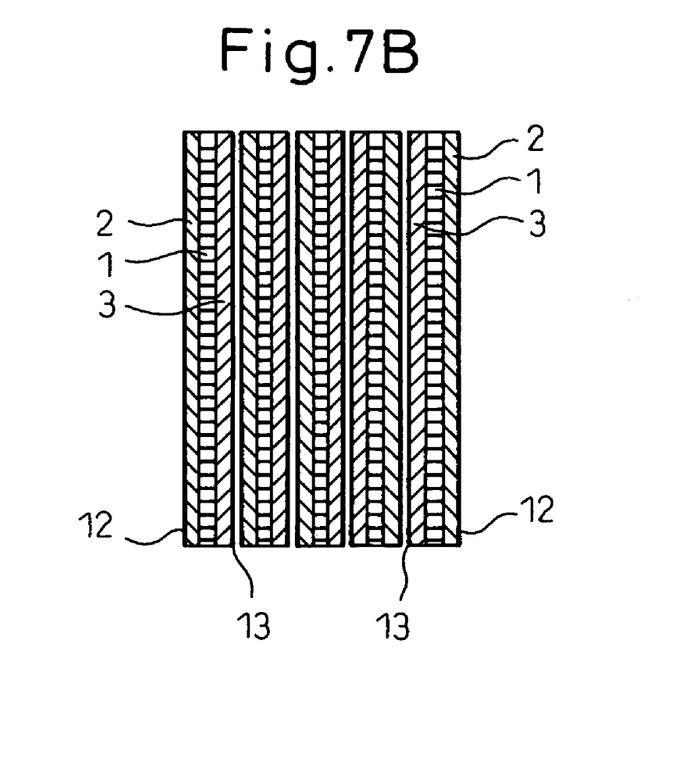

FIGS. 7A and 7B show the spirally wound solid oxide fuel cell unit as the solid oxide fuel cell used in the fuel cell power generating apparatus according to the sixth embodiment. FIG. 7A shows a top plan view of one spirally wound solid oxide fuel cell unit, and FIG. 7B shows a vertical cross-sectional view taken along line X-X in FIG. 7A.

The solid oxide fuel cell unit C is the same as the solid oxide fuel cell unit shown in FIG. 8 in that it comprises a solid oxide substrate 1, a cathode electrode layer 2, and an anode electrode layer 3, but differs in that the single rectangular solid oxide fuel cell unit with the solid oxide substrate 1, the cathode electrode layer 2, and the anode electrode layer 3 laid one on top of another is wound around a vertical axis to form a spirally wound structure. In FIG. 7, the fuel cell unit is wound with the cathode electrode layer 2 facing out, but it may be wound with the anode electrode layer 3 facing out. Here, the spirally wound solid oxide fuel cell unit itself may be constructed from a stack of a plurality of solid oxide fuel cell units each comprising a solid oxide substrate 1, a cathode electrode layer 2, and an anode electrode layer 3.

Further, when the external shape of the spirally wound structure is rectangular as shown in FIG. 7A, it can be conveniently housed inside a rectangular box-like wall structure 11 such as one used in other embodiments, and it is also possible to house a plurality of solid oxide fuel cell units C in a vertical position. On the other hand, when the external shape of the spirally wound structure is circular, the horizontal cross-sectional shape of the wall structure for housing the solid oxide fuel cell unit C must also be made circular.

If a current collecting layer 12 is provided on the outer surface of the cathode electrode layer 2 and a current collecting layer 13 on the outer surface of the anode electrode layer 3, the power generation output of the fuel cell can be effectively extracted. For the current collecting layers, use can be made of metal meshes or metal wires embedded in the respective electrode layers as earlier described. Further, an electrically insulating porous layer is formed between the cathode electrode layer 2 and the anode electrode layer 3 to prevent the cathode electrode layer 2 and the anode electrode layer 3 from contacting each other when the solid oxide fuel cell unit C is spirally wound.

When arranging a plurality of spirally wound solid oxide fuel cell units C in parallel within the wall structure 11, every one of the plurality of solid oxide fuel cell units C may be constructed from a wound structure spirally wound with either its cathode electrode layer or anode electrode layer facing out, or the plurality of solid oxide fuel cell units C may be constructed from a pair or pairs of wound structures each pair consisting of a wound structure spirally wound with its cathode electrode layer facing out and a wound structure spirally wound with its anode electrode layer facing out.

When every one of the plurality of solid oxide fuel cell units C is constructed from a wound structure spirally wound with either its cathode electrode layer or anode electrode layer facing out, this means that all the solid oxide fuel cell units C are connected in parallel; on the other hand, when the plurality of solid oxide fuel cell units C is constructed from a pair or pairs of wound structures each pair consisting of a wound structure spirally wound with its cathode electrode layer facing out and a wound structure spirally wound with its anode electrode layer facing out, this means that the two solid oxide fuel cell units in each pair are connected in series.

The thus constructed solid oxide fuel cell units C are stacked in a vertical position and housed inside the wall structure 11, as in the second to fifth embodiments, and the mixture gas is fed into the space formed above the solid oxide fuel cell units C by the mixture gas supply device 18. On the other hand, in the space formed below the solid oxide fuel cell units C, the exhaust gas and the mixture gas exiting from the solid oxide fuel cell units C are burned, producing a flame.

As described above, according to the construction of the power generating apparatus that uses the solid oxide fuel cell according to the sixth embodiment, not only can the container of the solid oxide fuel cell be constructed in an open-type structure and the apparatus be simplified in construction, but also the thermal energy generated by the combustion of the exhaust gas can be effectively utilized, as in the second to fifth embodiments. Furthermore, the exhaust gas can be treated easily and safely.

What is claimed is:

1. A solid oxide fuel cell power generating apparatus, comprising:
    a solid oxide fuel cell unit having a solid oxide substrate, a porous cathode electrode layer formed on one surface of said substrate, and a porous anode electrode layer formed on the other surface of said substrate opposite from said one surface;
    a wall structure forming a housing section for housing said solid oxide fuel cell unit mounted in a vertical position;
    a supply device for supplying air and fuel to said solid oxide fuel cell unit from said housing section; and
    a combustion device for heating said solid oxide fuel cell unit by combusting an exhaust gas exiting from a lower end of said solid oxide fuel cell unit in a space below said housing section, wherein
    said supply device supplies a mixture gas containing said air and said fuel to each of said solid oxide fuel cell units from an upper end thereof, and
    said wall structure having an electrically insulating porous layer formed on a lower surface of said housing section, and wherein said exhaust gas is supplied to said combustion device via the electrically insulating layer.

2. A solid oxide fuel cell power generating apparatus as claimed in claim 1, wherein a plurality of said solid oxide fuel cell units, each formed in the shape of a flat plate, are stacked and housed in said housing section.

3. A solid oxide fuel cell power generating apparatus as claimed in claim 2, wherein said cathode electrode layer or said anode electrode layer of each of said solid oxide fuel cell units is in direct contact with said anode electrode layer or said cathode electrode layer of an adjacent one of said solid oxide fuel cell units.

4. A solid oxide fuel cell power generating apparatus as claimed in claim 2, wherein
    said solid oxide fuel cell units are stacked by interposing a separator layer between each of said solid oxide fuel cell units and an adjacent one of said solid oxide fuel cell units, and
    said supply device supplies said air to each of said cathode electrode layers from an upper end thereof, and supplies said fuel to each of said anode layers from an upper end thereof.

5. A solid oxide fuel cell power generating apparatus as claimed in claim 4, wherein said separator layer is formed from an electrically conductive or electrically insulating plate.

6. A solid oxide fuel cell power generating apparatus as claimed in claim 1, wherein said solid oxide fuel cell units are stacked by interposing a gas-permeable electrically conductive layer between each of said solid oxide fuel cell units and an adjacent one of said solid oxide fuel cell units.

7. A solid oxide fuel cell power generating apparatus as claimed in claim 6, wherein said electrically conductive layer is formed from a metal or electrically conductive ceramic porous structure.

8. A solid oxide fuel cell power generating apparatus as claimed in claim 7, wherein said electrically conductive layer has a groove formed in the vertical direction.

9. A solid oxide fuel cell power generating apparatus as claimed in claim 7, wherein said electrically conductive layer is formed from a plate corrugated at right angles to the vertical direction.

10. A solid oxide fuel cell power generating apparatus as claimed in claim 6, wherein said electrically conductive layer is formed from a metal or carbon woven fabric.

11. A solid oxide fuel cell power generating apparatus as claimed in claim 2, wherein
    said plurality of solid oxide fuel cell units are divided into unit arrays, and said unit arrays are stacked inside said wall structure, and wherein
    an electrically insulating intervening layer is inserted between said stacked unit arrays, and outputs of said unit arrays are connected in parallel.

12. A solid oxide fuel cell power generating apparatus as claimed in claim 2, wherein
    said plurality of solid oxide fuel cell units are divided into unit arrays vertically by interposing an electrically insulating porous layer therebetween, and said unit arrays are stacked inside said wall structure, and wherein
    outputs of said unit arrays are connected in parallel.

13. A solid oxide fuel cell power generating apparatus ass claimed in claim 1, wherein said solid oxide fuel cell unit is formed as a wound structure spirally wound around a vertical axis.

14. A solid oxide fuel cell power generating apparatus as claimed in claim 13, wherein said wound structure is formed from a plurality of solid oxide fuel cell units stacked one on top of another.

15. A solid oxide fuel cell power generating apparatus as claimed in claim 13, wherein a plurality of said wound structures are arranged in parallel to each other within said housing section.

16. A solid oxide fuel cell power generating apparatus as claimed in claim 13, wherein said supply device supplies a mixture gas containing said air and said fuel to said solid oxide fuel cell unit from an upper end thereof.

17. A solid oxide fuel cell power generating apparatus as claimed in claim 1, wherein a heat insulator layer is provided on an outside of said wall structure.

18. A solid oxide fuel cell power generating apparatus as claimed in claim 17, wherein a cooler or a heat exchanger is provided on an outside of said heat insulator layer.

* * * * *